United States Patent [19]
Ääriläa

[11] Patent Number: 5,698,637
[45] Date of Patent: Dec. 16, 1997

[54] METHOD FOR FUNCTIONALIZATION OF POLYOLEFINS

[75] Inventor: Jari Ääriläa, Porvoo, Finland

[73] Assignee: Borealis Holding A/S, Lyngby, Denmark

[21] Appl. No.: 481,261

[22] PCT Filed: Dec. 17, 1993

[86] PCT No.: PCT/FI93/00544

§ 371 Date: Jun. 30, 1995

§ 102(e) Date: Jun. 30, 1995

[87] PCT Pub. No.: WO94/15981

PCT Pub. Date: Jul. 21, 1995

[30] Foreign Application Priority Data

Dec. 31, 1992 [FI] Finland .................................. 925965

[51] Int. Cl.⁶ .................... C08F 255/02; C08F 255/04; C08F 255/06; C08F 255/08

[52] U.S. Cl. .................... 525/285; 525/258; 525/284; 525/301; 525/302; 525/308; 525/309; 525/310; 525/312; 525/313; 525/316; 525/319

[58] Field of Search .................... 525/285, 301, 525/309, 310, 302, 308, 313, 316, 319

[56] References Cited

PUBLICATIONS

Abstract of DE 2,023,154 Nov. 1970.

*Primary Examiner*—Fred Zitomer
*Attorney, Agent, or Firm*—Birch, Stewart, Kolasch & Birch, LLP

[57] ABSTRACT

A method for modifying polyolefins by grafting with a carboxylic acid, carboxylic acid anhydride or other functionalized monomer in the presence of two additional comonomers, one being an aliphatic diolefin and the other an aromatic vinyl or (meth)acrylate monomer.

15 Claims, No Drawings

METHOD FOR FUNCTIONALIZATION OF POLYOLEFINS

The invention relates to a method for the functionalization of polyolefins in molten state so that the obtained product, as such or melt-mixed with other polyolefins, will achieve good adhesion with other polymers, metals, or other inorganic materials. The invention relates both to a method for the preparation of functional polyolefins and to multilayer products and mixtures of a functional polymer with other polymers and/or an inorganic substance, prepared by using the method.

The grafting of a functional unsaturated monomer onto polyolefins, in particular onto polypropylene, can be carried out by at least three different technologies.

The grafting can be carried out at a temperature below the melting temperature of the polymer, for example in a fluid-bed reactor. In this case, a very long reaction time can be selected, thus making possible a high conversion of the monomer. Any ungrafted monomer can be removed by vacuum stripping (U.S. Pat. No. 3,414,551).

Another prior known method is based on solution or suspension grating, in which the polymer is grafted in a hydrocarbon solvent, in general at a temperature of 80°–160° C. Any unreacted monomer can be rinsed off with alkali-containing water (EP 202 921, U.S. Pat. No. 4,698,395).

A third commonly used method is grafting in molten state, e.g. in a single- or twin-screw extruder. This method has the disadvantages that the reaction time is limited and the reaction temperature is higher than in the above methods, and therefore the conversion usually remains rather low and the breaking up of polymer chains is considerable. The amount of free monomer can in part be reduced by means of vacuum suction or extraction methods, but these methods are usually ineffective and/or expensive.

German patent publication DE 2 023 145 discloses a method in which the grafting of a maleic acid anhydride onto a polymer can be enhanced by using as an aid one vinyl monomer. However, the method has the disadvantage that the amount of vinyl monomer required is high. The adhesion properties of the product are not reported.

European patent application EP 280 454 discloses a method in which, in addition to the functional monomer, a second monomer, for example styrene, is used in the grafting which copolymerizes under the effect of heat. The "grafting reaction" is performed in the absence of peroxide initiators which produce polymer radicals. The polyolefin used must not contain antioxidants.

Epoxy functionalization of ethylene-propylene rubber and ethylene-propylene-diene rubber is disclosed in patent application EP 274 744. According to it, the functionalization is performed with the aid of a peroxide initiator by using, for example, glycidyl acrylate as the functionalizing agent.

The present invention is characterized in that a polyolefin is grafted with a functional monomer and, in addition, two comonomers are used, of which one is an aliphatic (di)olefin and the other is an aromatic vinyl monomer or (meth) acrylate monomer.

The polymer to be functionalized is a polyolefin, such as a homo-, co- or terpolymer of ethylene, propylene, butene, or 4-methyl-pentene.

The functional monomer is an unsaturated carboxylic acid having a carbon-carbon double bond, a carboxylic acid anhydride, or some other carboxylic acid derivative such as carboxylic acid ester. Also an imide, either as such or imidized in situ from an anhydride, belongs to this group. Especially recommended are α-unsaturated carboxylic acids, corresponding anhydrides, and epoxy-, amino- and hydroxy functional (meth)acrylates. The amount of the functional monomer is 0.1–10% by weight, preferably 0.2–5% by weight, of the amount of the polymer.

In addition to the functional monomer the method of the invention uses so-called co-monomers, which can be divided into two categories: (1) aliphatic diolefins such as $C_6$–$C_{18}$ α-olefins, preferably 1-octene, and (2) aromatic vinyl monomers and (meth)acrylates, preferably styrene or paramethyl styrene or butyl acrylate. The combined total amount of the comonomers is 0.01–30% by weight, preferably 0.1–10% by weight, of the amount of the polymer.

Free-radical initiators are used for the production of polymer radicals. Free-radical initiators are often peroxides, such as diacyl peroxides, dialkyl peroxides, peroxy acids, peroxy esters, hydroperoxides, and alpha-oxy- and alpha-peroxyhydroperoxides or -hydroperoxides. Other free-radical initiators that should be mentioned include azo-compounds, N-nitrosoanilides, and combinations of dialkyl peroxides with silanes. The initiator is typically fed directly into the melt-mixing apparatus, but can also be mixed in advance with polymer pellets. The amount of the initiator to be used is affected, for example, by the amount of additives present in the polymer. In general, initiator is used in an amount of 0.01–2% by weight of the amount of the polymer to be functionalized.

The grafting reaction is performed in molten state by using a twin-roll mill, a Banbury mixer, or a single- or twin-screw extruder. The recommended reaction temperature is 160°–260° C., and the reaction time is at minimum 15 seconds. According to a preferred embodiment, the polymer or the polymer mixture, the functional monomer, and at least a portion of the comonomer (1) and the peroxide are fed in at the initial stage of the reaction. The comonomer (2) may be fed in simultaneously or even considerably later, depending on the desired properties of the end product.

The disadvantages of the state-of-the-art methods, such as low conversion and deleteriously high breaking up of the polymer chains (polypropylene) can be avoided by the method according to the present invention. By the method according to the invention, an effective conversion of the functional monomer, a controlled change in the melt index, easy compounding, insignificant change of color of the basic polymer, and excellent properties of the end product are achieved.

The product of the invention can be used as an adhesion plastic or its component, as a compatibilizer of polymer mixtures, as a coupling agent between polymers and inorganic materials, as a reducer of the migration of stabilizers, and as an improver of the dyeability and paintability of polymers.

The invention is described in greater detail with the help of the following examples.

The conversion of maleic acid anhydride in a twin-screw extruder in the absence of comonomers is typically approx. 30%. This can also be seen in Comparative Examples 1 and 2. When the method according to the invention is used, the conversion of maleic acid anhydride is 65–86%, as can be seen in Examples 3–8. Examples 9–13 show the excellent adhesion and compatibilizing properties of the functional polymer prepared by the method of the invention. In example 14, the invention is compared with the functionalization methods disclosed in patent applications DE 2 023 154 and EP 280 454.

EXAMPLE 1

(Comparative Example)

A homopolypropylene powder (melt index MFR=1.9, manufacturer Neste Chemicals) was grafted with maleic acid anhydride (MAH) is a Berstorff ZB25*39.5D twin-screw extruder by using a temperature profile of 160°-200° C. The amount of maleic acid anhydride fed in was 1.5%. The initiator used was 0.1% of 1,3-bis(tert-butylperoxy-isopropyl)benzene (Perkadox 14S, Akzo Chimie BV). The total and free acid contents in the end product were determined by titration.

The conversion of the maleic acid anhydride was 31%, and the amount of free acid was 1.06%. The melt index (MFR) of the product was 108. The color of the product was brownish.

The test results of Examples 1-8 are compiled in Table 1 after Example 8.

EXAMPLE 2

(Comparative Example)

The experiment according to Example 1 was repeated by using, instead of homopolypropylene, a random copolypropylene which had ethylene as a comonomer and which had a melt index of 1.8 and a typical melting point (DSC) of 142°-144° C. (manufacturer Neste Chemicals).

EXAMPLE 3

The experiment according to Example 1 was repeated by using additionally 0.75% of 1-octene and 0.75% of styrene. The comonomers were fed in at the beginning of the reaction.

EXAMPLE 4

The experiment according to Example 2 was repeated by using in the feed additionally 0.75% of 1-octene and 0.75% of styrene. The comonomers were fed in at the beginning of the reaction.

EXAMPLE 5

The experiment according to Example 1 was repeated by using additionally 1.5% of 1-octene and 1.5% of styrene.

EXAMPLE 6

The experiment according to Example 1 was repeated, but by using glycidyl methacrylate instead of maleic acid anhydride and additionally 1.5% of 1-octene and 1.5% of styrene.

EXAMPLE 7

The experiment according to Example 1 was repeated by using additionally 1.5% of 1-decene and 1.5% of paramethyl styrene.

EXAMPLE 8

The experiment according to Example 1 was repeated by using in the feed 3% of maleic acid anhydride and additionally 3% of 1-octene and 3% of styrene.

The test results of Examples 1-8 show that the adding of comonomers improves the conversion of the maleic acid anhydride considerably and decreases the amount of free acid in the end product. The increasing of the comonomer concentration improves the results, but a considerable improvement is achieved even with low concentrations. The color of the product remains good, i.e. the product is colorless, when the grafting is carried out by the method according to the invention.

TABLE 1

Properties of functionalized polymers

| | MAH conversion (%) | Free acid (%) | MFR | Color |
|---|---|---|---|---|
| Example 1 | 31 | 1.06 | 108 | brownish |
| Example 2 | 31 | 0.58 | 128 | brownish |
| Example 3 | 66 | 0.28 | | |
| Example 4 | 67 | 0.26 | | |
| Example 5 | 65 | 0.06 | 27 | colorless |
| Example 6 | — | — | 21 | colorless |
| Example 7 | 78 | 0.06 | 18 | colorless |
| Example 8 | 86 | 0.09 | 24 | colorless |

EXAMPLE 9

The product according to Example 5 was melt-mixed with a homopolypropylene (VB19 50K, manufacturer Neste Chemicals) and an ethylene-propylene elastomer (Keltan 740P, DSM Elastomers) at the ratio of 25/50/25%. The amount of free styrene measured in the end product was 5 ppm.

The adhesive of the obtained product was tested by using it as an adhesion layer between an expoxy-coated (Eurokote 714.32, Bitumes Speclaux) steel sheet and a heterophase polypropylene (SA40 20G, Neste Chemicals) used as the surface material. The thickness of the surface layer was 1800 μm and the thickness of the adhesive layer was 200 μm. The number of steel sheets was 7 and their temperatures varied within the range of 175°-220° C. The adhesion was higher than the tensile strength of the surface material (270-320N/cm).

EXAMPLE 10

The product according to Example 1 was melt-mixed with a homopolypropylene (VB19 50K, Neste Chemicals) and an ethylene-propylene elastomer (Keltan 740P, DSM Elastomers) at the ratio of 25/50/25%. The amount of free acid measured was 0.18%.

When the above experiment was repeated by using additionally 0.3% of n-butyl acrylate and 0.2% of octadecene and 0.02% of a peroxide initiator (Perkadox 14S, Akzo Chimie BV), the amount of free acid measured was 0.08%. When styrene was used instead of n-buty acrylate, the amount of free acid was the same, 0.08%.

Of the last-mentioned material, a 5-layer laminate 900 mm wide was prepared on an Er-We-Pa flat board line. The structure of the laminate was homopolypropylene/adhesion plastic/ethylene-vinyl alcohol polymer (EVAL F101, Kuraray Co, Ltd)/adhesion plastic/homopolypropylene. The thicknesses of the layers were 450/45/65/45/450 μm. The processing temperatures of the materials were 220°-250° C. The inter-layer adhesion measured was 40N/cm.

When the experiment was repeated by using commercial adhesion plastics Admer QF 500 E (Mitsui Petrochemical Industries) and Modic P300F (Mitsubishi Petrochemical Industries), the adhesions obtained were 11N/cm and 34N/cm.

EXAMPLE 11

The product according to Example 6 was melt-mixed in a Berstorff ZE25*33D twin-screw extruder with a polybutene terephthalate (Crastin S600, Ciba-Geigy Marienberg GmbH) and a homopolypropylene (VC12 12H, Neste Chemicals) at the ratio of 4/20/76% by using zone temperatures of 240° C. and a screw velocity of 200 rpm. A comparative experiment (Run 2) was performed by using, instead of the product of Example 6, a commercial compatibilizer Exxelor PO 1015 (EXXON). Test bars were prepared from the material by means of a Krauss-Maffei KM 60-210B2 injection press by using zone temperatures of 230°–250° C. and a mold temperature of 65° C. The mechanical properties of the materials were tested according to ISO/R527.

The results are shown in Table 2.

TABLE 2

| | Mechanical properties | |
|---|---|---|
| Compatibilizer | Run 1 Product of Example 6 | Run 2 Exxelor PO 1015 |
| Yield strength, MPa | 36.8 | 34.4 |
| Tensile elastic modulus, MPa | 1890 | 1760 |

EXAMPLE 12

Glassfiber-reinforced materials were melt-mixed in a Berstorff ZE25*33D twin-screw extruder by using zone temperatures of 240° C., a screw velocity of 160 rpm, and a polymer feed of 5.5 kg/h. The glassfiber was fed into zone 4.

The commercial products used were:

PP=homopolypropylene, VC12 12H, Neste Chemicals

Glassfiber=Vetrotex 5137, Vetrotex International

PBT=polybutene terephthalate, Crastin S600, Ciba Geigy Marienberg GmbH

Compatiblizer=a chemically modified polypropylene, Exxelor PO X1, EXXON

Four trial runs were performed, in which the following feed compositions were used:

Run 1: 76% PP, 20% glassfiber, 4% Exxelor compatibilizer

Run 2: 36.4% PP, 26% PBT, 35% glassfiber, 2.6% product of Example 5

Run 3: 36.4% PP, 26% PBT, 35% glassfiber, 2.6% product of Example 6

Run 4: 65% PBT, 35% glassfiber

Test bars were injection molded from the materials by means of a Krauss-Maffei KM 60-210B2 injection press by using zone temperatures of 245°–255° C. and a mold temperature of 80° C. The strength and rigidity values of the test bars are shown in Table 3.

TABLE 3

| | Strength and rigidity values | | | |
|---|---|---|---|---|
| | Run 1 | Run 2 | Run 3 | Run 4 |
| Tensile strength, MPa | 81 | 90 | 89 | 80 |
| Bending modulus, MPa | 4780 | 9340 | 9800 | 9500 |

As can be seen from the results, the polymers according to the invention work very well as coupling agents between glass and polymer.

EXAMPLE 13

Compatibilization was investigated further by melt-mixing, in a Berstorff ZE25*39.5D twin-screw extruder, polymer mixtures which contained 57% of a homopolypropylene (VC12 12H, Neste Chemicals), 38% of polyamide-66 (Grilon T300GM, EMS Chimie AG), and 5% of a compatibilizer. The compatibilizers used were the polymer according to Example 5 (Run 1) and, on the other hand, a commercial chemically modified polypropylene recommended for compatibilization (Exxelor PO XI 1015, EXXON). The properties of the polymer mixtures are compared in Table 4.

TABLE 4

| Compatibilization of a mixture of polypropylene and polyamide | | |
|---|---|---|
| Compatibilizer | Run 1 According to Example 6 | Run 2 Exxelor PO XI 1015 |
| Tensile elastic modulus MPa | 2320 | 2310 |
| Yield strength MPa | 46 | 44 |
| Elongation at yield % | 5.6 | 5.7 |
| HDT (0.46 MPa) °C. | 117 | 112 |

EXAMPLE 4

Polypropylene (melt index MFR=3.2, Neste Chemicals) was grafted in a Berstorff ZE25*33D twin-screw extruder by using a temperature profile of 160°–200° C. and a screw velocity of 200 rpm. The components used in the experiments were pre-mixed in a barrel mixer before being fed into zone 1 of the extruder.

Run 1 was carried out in accordance with Patent EP 280 454, in the absence of free-radical initiator by using 1.5% of maleic acid anhydride and 0.75% of paramethyl styrene.

Run 2 was carried out in accordance with Patent DE 2 023 154 by using 0.05% of Perkadox 14S free-radical initiator, 1.5% of maleic acid anhydride, and 0.75% of paramethyl styrene.

Run 3 was carried out in accordance with the invention by using 0.05% of Perkadox free-radical initiator, 1.5% of maleic acid anhydride, 0.75% of paramethyl styrene, and 0.75% of octadecene.

Run 4 was also carried out in accordance with the invention, as Run 3, but additionally 1500 ppm of Irganox B215 (Ciba Geigy) antioxidant was used.

The amount of unreacted maleic acid anhydride (MAH) was analyzed by extracting from a ground polymer sample the free MAH in boiling isopropanol and by titrating the extraction solution with potassium hydroxide. The results are shown in Table 5. The results show that, when the method according to the invention used, the amount of free maleic acid anhydride is clearly smaller and the use of antioxidants does not interfere with the grafting.

TABLE 5

| Amount of free maleic acid anhydride | |
|---|---|
| | Free MAH, % |
| Run 1 | 0.82 |
| Run 2 | 0.48 |
| Run 3 | 0.37 |
| Run 4 | 0.25 |

I claim:

1. A method for preparing a modified polyolefin by grafting onto it in molten state an unsaturated carboxylic acid, a carboxylic acid anhydride or carboxylic acid ester as the functional monomer, wherein in addition to the functional monomer, two comonomers are used of which one is an aliphatic monoolefin or aliphatic diolefin and the other an aromatic vinyl monomer or (meth)acrylate monomer.

2. A method according to claim 1, wherein the amount of the functional monomer is 0.1–10% by weight of the amount of the polyolefin.

3. A method according to claim 1, wherein the combined total amount of the comonomers is 0.01–30% by weight of the amount of the polyolefin.

4. A method according to claim 1, wherein the aliphatic monoolefin is a $C_6$–$C_{18}$ α-olefin.

5. A method according to claim 1, wherein the aromatic vinyl monomer is styrene or para-methyl styrene.

6. A method according to claim 1, wherein the (meth) acrylate monomer is alkyl (meth)acrylate.

7. A method according to claim 1, wherein the functional monomer is maleic acid anhydride.

8. A method according to claim 1, wherein the functional monomer is glycidyl (meth)acrylate.

9. A method according to claim 1, wherein the polyolefin is a homo-, co- or terpolymer of ethylene, propylene, butene or 4-methylpentene.

10. A modified polyolefin onto which has been grafted in the molten state 0.1–10% by weight of an unsaturated carboxylic acid, carboxylic acid anhydride or carboxylic acid ester, wherein in connection with the molten-state grafting, there has been cografted an aliphatic monoolefin or aliphatic diolefin and an aromatic vinyl monomer or (meth) acrylate monomer, the total combined amount of which is 0.01–30% by weight of the amount of the polyolefin.

11. A process of using a modified polyolefin prepared according to any one of claims 1–9 as an adhesion plastic or its component, as a compatibilizer, or as a coupling agent between polymers and inorganic materials.

12. A process of using a modified polyolefin according to claim 10 as an adhesion plastic or its component, as a compatibilizer, or as a coupling agent between polymers and inorganic materials.

13. The method according to claim 2, wherein the amount of the functional monomer is 0.2–5% by weight.

14. The method according to claim 3, wherein the combined total amount of the comonomers is 0.1–10% by weight.

15. The method according to claim 4, wherein the $C_6$–$C_{18}$ α-olefin is 1-octene or 1-decene.

* * * * *